US008913879B2

(12) United States Patent
Ashley et al.

(10) Patent No.: US 8,913,879 B2
(45) Date of Patent: Dec. 16, 2014

(54) METHOD AND SYSTEM FOR SIMULTANEOUS RECORDING OF MULTIPLE PROGRAMS ON A DVR

(75) Inventors: Alex Ashley, Redhill Surrey (GB); Pete Rai, Egham Surrey (GB); Trevor Smith, Twickenham (GB); Ray Taylor, Hook Hampshire (GB); James Geoffrey Walker, Winchester Hampshire (GB); Kevin A. Murray, Fordingbridge Hampshire (GB)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 13/392,658

(22) PCT Filed: Jun. 29, 2010

(86) PCT No.: PCT/IB2010/052968
§ 371 (c)(1),
(2), (4) Date: Apr. 9, 2012

(87) PCT Pub. No.: WO2011/027236
PCT Pub. Date: Mar. 10, 2011

(65) Prior Publication Data
US 2012/0189285 A1    Jul. 26, 2012

(30) Foreign Application Priority Data
Sep. 2, 2009 (GB) .................................. 0915240.6

(51) Int. Cl.
*H04N 5/76* (2006.01)
(Continued)

(52) U.S. Cl.
CPC ...... *H04N 21/26606* (2013.01); *G11B 27/3027* (2013.01); *G11B 27/105* (2013.01);
(Continued)

(58) Field of Classification Search
CPC ........... H04N 5/76; H04N 5/81; H04N 5/765; H04N 5/85; H04N 5/782; H04N 9/8042; H04N 7/084; H04N 9/81; H04N 11/08; H04N 5/781; H04N 9/8063; H04N 5/783; H04N 21/47214; H04N 21/4334; G11B 27/3027; G11B 20/11; G11B 27/005; G11B 2220/20; G11B 27/105; G11B 27/034; G11B 27/329; G11B 2220/90; G11B 15/1875; G11B 5/0086; G11B 19/28; G11B 27/28; G11B 27/34; G09B 5/065; G09B 5/12; G09B 7/04
USPC .................................. 386/213–222, 291, 298
See application file for complete search history.

(56) References Cited

U.S. PATENT DOCUMENTS 6,788,882 B1    9/2004 Geer et al.
6,986,159 B1 *  1/2006 Shimoji et al. ................ 725/142
(Continued)

FOREIGN PATENT DOCUMENTS

EP    0 994 590 A2    4/2000
EP    1 271 526 A2    1/2003
(Continued)

OTHER PUBLICATIONS

Transmittal of International Search Report and Written Opinion of International Searching Authority for captioned application.
(Continued)

*Primary Examiner* — Nigar Chowdhury
(74) *Attorney, Agent, or Firm* — Husch Blackwell LLP

(57) ABSTRACT

A method and system for broadcasting content, is described, the method and system facilitating simultaneous recording of multiple programs on a digital video recorder (DVR), the method and system including providing a plurality of content items, dividing each one of the plurality of content items into a multiplicity of chunks, each one of the chunks including at least one reference frame, for each one of the chunks determining a location of each reference frame included in the chunk, creating a chunk index of locations of each reference frame included in the chunk, creating a chunk file including the chunk and the chunk index, and inserting the chunk file in a data stream, such that no chunk file including a chunk from a particular content item is adjacent to a second chunk file including a chunk from the same particular content item, and broadcasting using a transmission bitrate greater than the bitrate of the data stream in a single channel in a multiplexed broadcast service, wherein the chunks files in the data stream are transmitted sequentially. Related systems, apparatus, and methods are also described.

12 Claims, 5 Drawing Sheets

(51) Int. Cl.

| | |
|---|---|
| *G11B 27/30* | (2006.01) |
| *G11B 27/10* | (2006.01) |
| *H04N 21/2383* | (2011.01) |
| *H04N 21/4147* | (2011.01) |
| *H04N 5/781* | (2006.01) |
| *H04N 21/266* | (2011.01) |
| *H04H 20/30* | (2008.01) |
| *H04N 5/92* | (2006.01) |
| *H04N 21/845* | (2011.01) |
| *H04H 20/42* | (2008.01) |
| *H04N 9/82* | (2006.01) |
| *H04N 21/238* | (2011.01) |
| *H04N 21/433* | (2011.01) |

(52) U.S. Cl.
CPC ....... *H04N 21/2383* (2013.01); *H04N 21/4147* (2013.01); *H04N 5/781* (2013.01); *H04H 20/30* (2013.01); *H04N 5/9201* (2013.01); *H04N 21/8456* (2013.01); *H04H 20/426* (2013.01); *H04N 9/8205* (2013.01); *H04N 21/23805* (2013.01); *H04N 5/9205* (2013.01); *H04N 21/4334* (2013.01)
USPC .......................................... 386/291; 386/298

(56) References Cited

U.S. PATENT DOCUMENTS

| | | | |
|---|---|---|---|
| 7,251,832 B2 | | 7/2007 | Venters, III et al. |
| 7,586,938 B2 * | | 9/2009 | Klemets et al. ............ 370/465 |
| 2006/0015914 A1 | | 1/2006 | Lee |
| 2009/0034604 A1 | | 2/2009 | Delia et al. |
| 2009/0150673 A1 * | | 6/2009 | DeFreese et al. ............ 713/170 |

FOREIGN PATENT DOCUMENTS

| | | |
|---|---|---|
| EP | 1 289 297 A2 | 3/2003 |
| JP | 2008 278090 A | 11/2008 |
| WO | WO 01/35669 A1 | 5/2001 |
| WO | WO 03/010970 A2 | 2/2003 |
| WO | WO 2007/100443 A2 | 9/2007 |
| WO | WO 2011/030236 A1 | 3/2011 |

OTHER PUBLICATIONS

Alex Zambelli, "The Birth of Smooth Streaming" (Feb. 4, 2009) (from mhtml:file://\\ilstore\patents\P-numbers\P-369\Overflow\AlexZambelli'sSilverlight . . . ).

"Advanced Video Coding for Generic Audiovisual Services" (ITU-T Recommendation H.264) (International Telecommunication Union—Mar. 2005).

"Information Technology—Coding of Audio-Visual Objects. Part 12: ISO Base Media File Format" (International Standard 14496-12) (ISO/IEC Oct. 15, 2008).

"Information Technology—Coding of Audio-Visual Objects. Part 14: MP4 File Format" (International Standard 14496-14) (ISO/IEC Nov. 15, 2003).

"Information Technology—Coding of Moving Pictures and Associated Audio Information: Systems" (International Standard 13818-1) (ISO/IEC Dec. 1, 2000).

* cited by examiner

METHOD AND SYSTEM FOR SIMULTANEOUS RECORDING OF MULTIPLE PROGRAMS ON A DVR

The present application is a 35 USC §371 application of PCT/IB2010/052968, filed on 29 Jun. 2010 and entitled "Method and System for Simultaneous Recording of Multiple Programs on a DVR", which was published in the English language with International Publication Number WO 2011/027236, and which claims the benefit of priority from GB Patent Application GB 0915240.6 of NDS Limited, filed 2 Sep. 2009.

BACKGROUND OF THE INVENTION

The following patents and patent applications are believed to reflect the state of the art:

PCT/IL00/00276, of NDS Ltd., published in the English language as WO01/35669;

PCT/IL02/00534, of NDS Ltd., published in the English language as WO03/010970;

PCT/IB2010/052960, of NDS Ltd., as yet unpublished, filed 29 Jun. 2010;

JP 2008278090, of Hitachi Ltd.;

U.S. Pat. No. 7,251,832 to Venters, III. et al.; and

US 2009/0034604 of Delia, et al.

The following international standards and specifications are particularly relevant to the understanding of the disclosure of the present invention:

ITU-T Specification H.264 (03/2005), Advanced Video Coding for Generic Audiovisual Services;

ISO/IEC 13818-1, Information Technology—Generic Coding of Moving Pictures and Associated Audio Information: Systems (Second Edition, 2000);

ISO/IEC 14496-12, Information Technology—Coding of Audio-Visual Objects—Part 12: ISO Base Media File Format (Third Edition 2008); and ISO/IEC 14496-14, Information Technology—Coding of Audio-Visual Objects—Part 14: MP4 File Format (First Edition 2003).

SUMMARY OF THE INVENTION

The present invention, in certain embodiments thereof, seeks to provide an improved There is thus provided in accordance with an embodiment of the present invention a method for broadcasting content, the method facilitating simultaneous recording of multiple programs on a digital video recorder (DVR), the method including providing a plurality of content items, dividing each one of the plurality of content items into a multiplicity of chunks, each one of the chunks including at least one reference frame, for each one of the chunks determining a location of each reference frame included in the chunk, creating a chunk index of locations of each reference frame included in the chunk, creating a chunk file including the chunk and the chunk index, and inserting the chunk file in a data stream, such that no chunk file including a chunk from a particular content item is adjacent to a second chunk file including a chunk from the same particular content item, and broadcasting using a transmission bitrate greater than the bitrate of the data stream in a single channel in a multiplexed broadcast service, wherein the chunks files in the data stream are transmitted sequentially.

Further in accordance with an embodiment of the present invention the content item includes an encrypted content item.

Still Further in accordance with an embodiment of the present invention each of the chunks of the multiplicity of chunks includes at least one ECM.

Additionally in accordance with an embodiment of the present invention and further including determining, for each one of the chunks, a location of each ECM included in the chunk, including in the chunk index of locations the location each ECM included in the chunk.

Moreover in accordance with an embodiment of the present invention each chunk of the multiplicity of chunks includes a chunk of fixed play-back duration.

Further in accordance with an embodiment of the present invention the content item includes a compressed content item.

Still further in accordance with an embodiment of the present invention the compressed content item includes an H.264/MPEG-4 compressed content item.

Additionally in accordance with an embodiment of the present invention the compressed content item is encapsulated using ISO 14496-12 file format Movie Fragments (MOOF).

Moreover in accordance with an embodiment of the present invention the content item includes a live broadcast content item.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
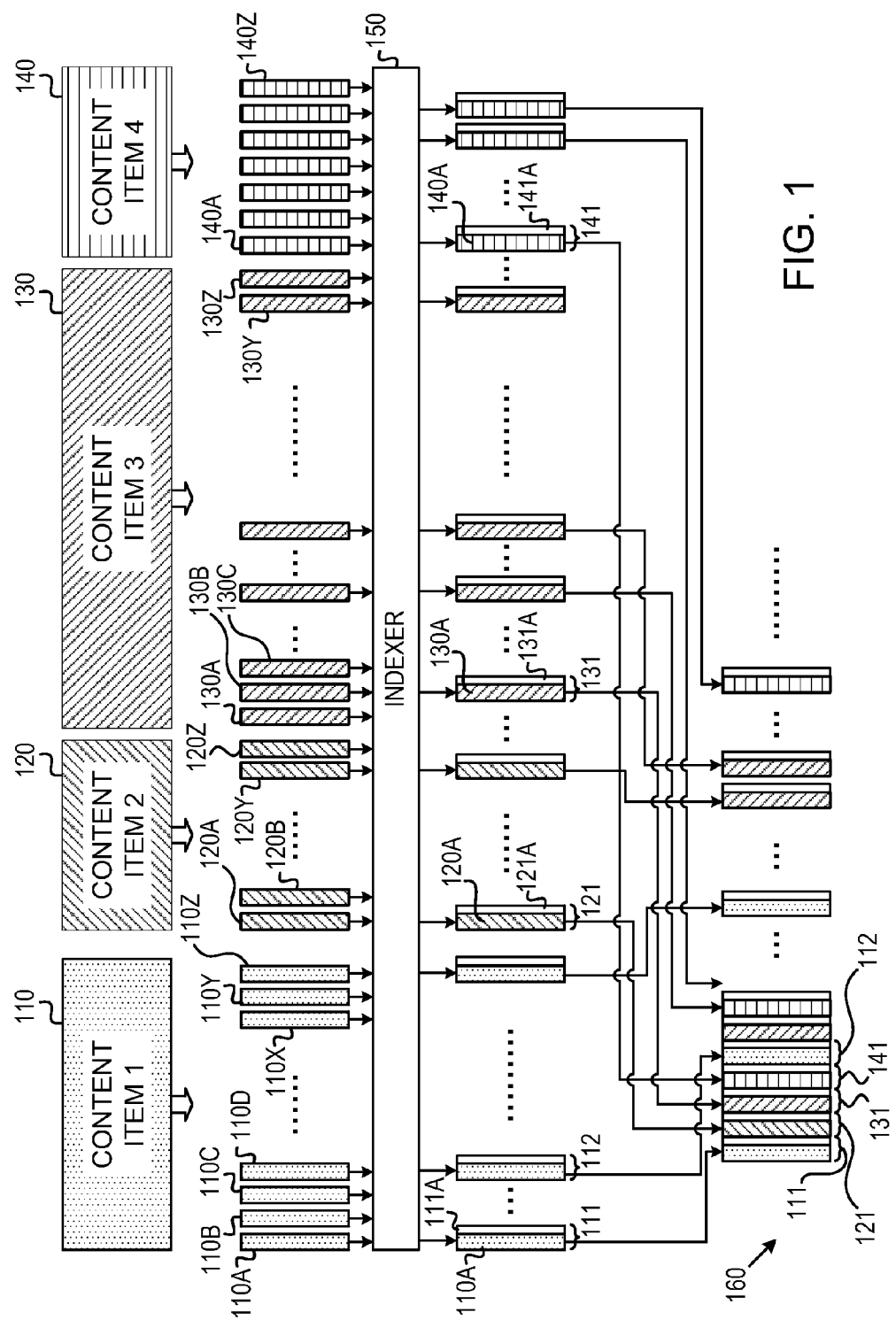
FIG. 1 is a simplified pictorial illustration of a system of broadcasting content facilitating simultaneous recording of multiple programs on a digital video recorder constructed and operative in accordance with an embodiment of the present invention.

Reference is now made to FIG. 1, which is a simplified pictorial illustration of a system of broadcasting content facilitating simultaneous recording of multiple programs on a digital video recorder constructed and operative in accordance with an embodiment of the present invention.

The system of FIG. 1 comprises a plurality of content items 110, 120, 130, 140, apparatus (not depicted) operative to divide each content item 110, 120, 130, 140 into a multiplicity of chunks 110a, 110b, 110c, 110d, . . . , 110x, 110y, 110z, 120a, 120b, . . . , 120y, 120z, 130a, . . . , 130z, 140a, . . . , 140z, an indexer 150, and a data stream assembler (not depicted). It is appreciated that the apparatus (not depicted) operative to divide each content item 110, 120, 130, 140 and the data stream assembler (not depicted) are not depicted for ease of depiction in FIG. 1.

The operation of the system of FIG. 1 is now described. Each content item 110, 120, 130, 140 of the plurality of content items is divided into a multiplicity of chunks 110a, 110b, 110c, 110d, . . . , 110x, 110y, 110z, 120a, 120b, . . . , 120y,

120z, 130a, ..., 130z, 140a, ..., 140z by the apparatus (not depicted) operative to divide each content item 110, 120, 130, 140 into a multiplicity of chunks 110a, 110b, 110c, 110d, ..., 110x, 110y, 110z, 120a, 120b, ..., 120y, 120z, 130a, ..., 130z, 140a, ..., 140z. Each chunk of the multiplicity of chunks 110a, 110b, 110c, 110d, ..., 110x, 110y, 110z, 120a, 120b, ..., 120y, 120z, 130a, ..., 130z, 140a, ..., 140z is a chunk of fixed play-back duration. For example and without limiting the generality of the foregoing, each one of the multiplicity of chunks 110a, 110b, 110c, 110d, ..., 110x, 110y, 110z, 120a, 120b, ..., 120y, 120z, 130a, ..., 130z, 140a, ..., 140z may each require 30 seconds to play back.

Duration of the multiplicity of chunks 110a, 110b, 110c, 110d, ..., 110x, 110y, 110z, 120a, 120b, ..., 120y, 120z, 130a, ..., 130z, 140a, ..., 140z is typically bounded by a minimum duration beneath which a hard drive in a client device has insufficient transfer speed to record the content item 110, 120, 130, 140 and by a maximum size due to a real time playback delay introduced by storing the chunk on the hard drive in the client device.

The lack of hard disk bandwidth is caused by a need to seek the hard disk heads between the locations where each file is being recorded to disk. In a simple case of recording one event, the client device is appending data to one file which normally causes data to be written to the disk next to the last write to disk. If two recordings are being made, typically the hard disk is required to seek between the location where the first file is being recorded and the location where the second file is being recorded. A typical hard disk has a seek time of 9 ms, which is several orders of magnitude slower than the time taken to write the content item audio-visual data to disk. As the number of simultaneous recordings increases, the amount of time consumed performing seeks increases until a point is reached where there is insufficient time to service all recording requests.

Those skilled in the art will appreciate that the maximum speed at which a hard disk can write multiple streams of content can be estimated using the formulas:

1. $n\left(\dfrac{m+b}{r} + 2s\right) \leq c$

2. $nb \leq i$

Where:
r is the media transfer writing rate, in megabits per second
i is the drive interface speed, in megabits per second
s is the average random seek time, in seconds
b is the average bitrate of each content item, in megabits per second
m is the average size of the index data for one chunk, in megabits
c is the size of the chunk, in seconds
n is the number of streams being stored For example and without limiting the generality of the foregoing, a chunk duration of two minutes is believed by the inventors of the present invention to be too large, as a two minute chunk duration causes playback on the client device to be delayed by two minutes from live playback. An example of a typical 320 GB hard disk that might be used in a set top box:
r=640 Mb/s
i=3000 Mb/s
s=0.0042 seconds
b=4 Mb/s
m=0.00003 Mb
n=10.

By equation 1, the chunk size, c, must be greater than or equal to:

$$10\left(\dfrac{0.00003 + 4}{640} + 2*0.0042\right) \leq c$$

so, chunk size (c) must be greater than or equal to 0.1465 seconds.

By equation 2, the drive interface speed (i) is:
$10*4 \leq i$, so, $40 \leq i$. Since i=3000 Mb/s, and i is two orders of magnitude greater than the required level (40), and so, drive interface speed i is not a constraining factor.

Each one of the multiplicity of chunks 110a, 110b, 110c, 110d, ..., 110x, 110y, 110z, 120a, 120b, ..., 120y, 120z, 130a, ..., 130z, 140a, ..., 140z is input into the indexer 150.

For each chunk of the multiplicity of chunks 110a, 110b, 110c, 110d, ..., 110x, 110y, 110z, 120a, 120b, ..., 120y, 120z, 130a, ..., 130z, 140a, ..., 140z, the indexer 150 performs the following operations:

the indexer 150 determines a location of each ECM comprised in the chunk;

the indexer 150 determines a location of each reference frame comprised in the chunk; and the indexer 150 creates a chunk index of locations of each ECM comprised in the chunk and each reference frame comprised in the chunk.

Those skilled in the art will appreciate that the term "reference frame" is used synonymously with the terms: "reference picture", "key frame", and "key picture". The term "reference picture" is understood to mean a "frame" or a "picture" containing samples that may be used for inter prediction in the decoding process of subsequent pictures in decoding order. Typical reference frames include I-frames (or I-pictures) and IDR (instantaneous decoding refresh) frames (or IDR pictures). These and other terms of the art are defined in ITU-T Specification H.264 (03/2005), Advanced Video Coding for Generic Audiovisual Services, Section 3, Definitions; and ISO/IEC 13818-1, Information Technology—Generic Coding of Moving Pictures and Associated Audio Information: Systems, Section 2.1, Definitions. H.264, Section 3 and ISO/IEC 13818-1, Section 2.1 are incorporated herein by reference.

A chunk file, comprising the chunk and the chunk index is created, as explained below.

Taking chunk 110a as an example, a chunk index 111a is added to the chunk 110a. A chunk file 111 results. Chunks 110b, 110c, ..., 110x, 110y, 110z, 120a, 120b, ..., 120y, 120z, 130a, ..., 130z, 140a, ..., and 140z similarly are added to chunk indexes in order to produce chunk files, such as: chunk file 121, comprising chunk 120a and chunk index 121a; chunk file 131, comprising chunk 130a and chunk index 131a; and chunk file 141, comprising chunk 140a and chunk index 141a.

The data stream assembler (not depicted) receives the chunk files 111, 121, 131, and 141. The chunk files 111, 121, 131, and 141 are assembled, by the data stream assembler (not depicted) into a data stream 160. The data stream assembler (not depicted) assembles the data stream 160 such that no chunk file comprising a chunk from a content item is adjacent to a second chunk file comprising a chunk from the same content item. For example and without limiting the generality of the foregoing, chunk file 111 will not be inserted into the data stream 160 adjacent to chunk file 112, since chunk file 111 and chunk file 112 both comprises chunks which are originally from the same content item.

Figure 2:
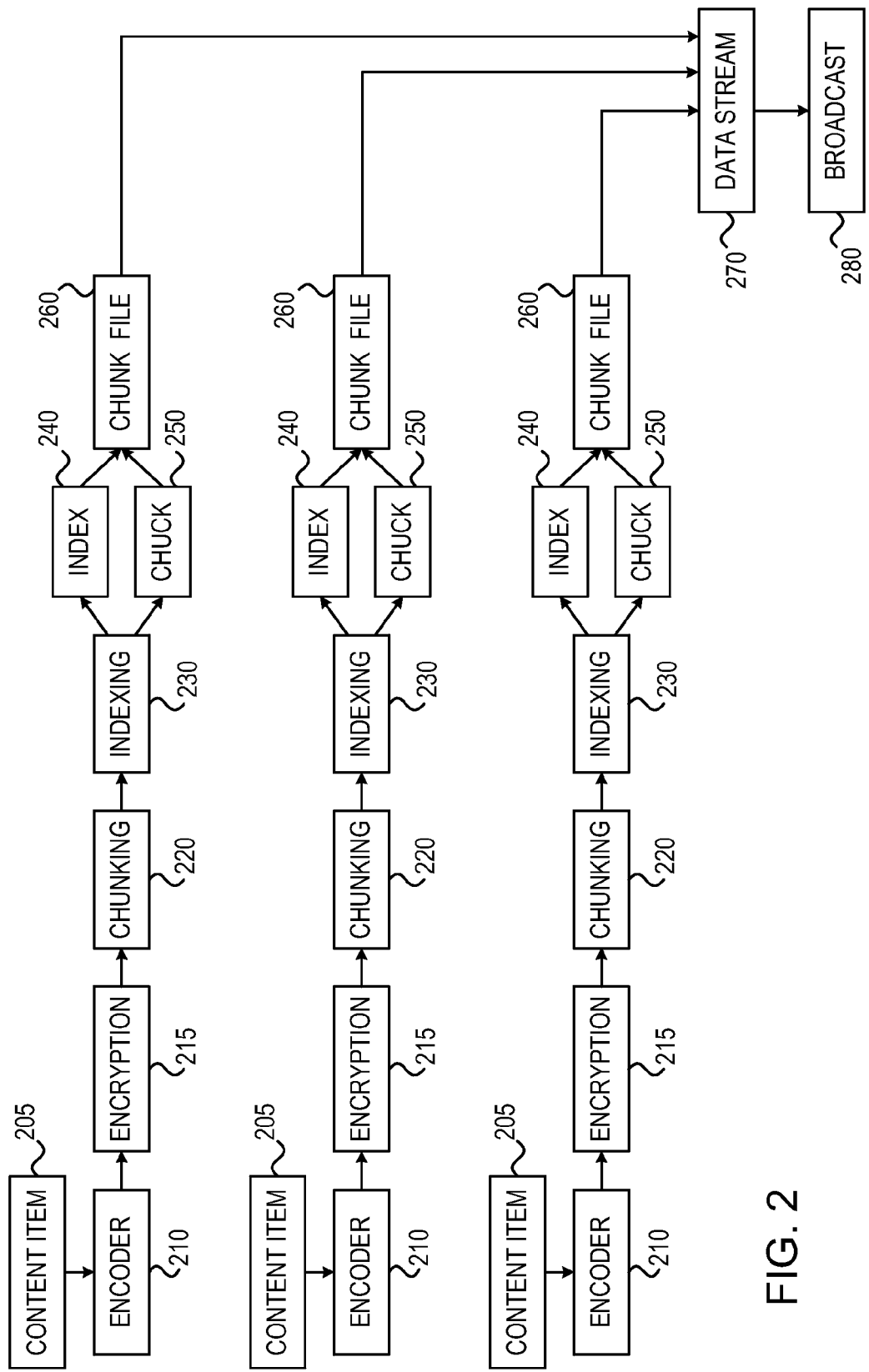
FIG. 2 is a simplified block drawing depicting an embodiment of creation of a data stream for broadcast within the system of FIG. 1.

Reference is now made to FIG. 2, which is a simplified block drawing depicting an embodiment of creation of a data stream for broadcast within the system of FIG. 1.

Content items 205 are typically prepared for broadcast by being input into an encoder 210, thereby undergoing an encoding or compression process, producing encoded content items. The encoded content items are optionally input into an encryptor for encryption 215. The encoded and optionally encrypted content items are then input into a chunking process 220. The chunking process 220 controls a plurality of buffers that are of a sufficient size to store a chunk of content (the size of the chunk is described above, inherently, as a property of the duration of the chunk). Each buffer of the plurality of buffers is configured to store the compressed (and optionally encrypted) chunks of content.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
  encoded, but neither scrambled nor encrypted;
  compressed, but neither scrambled nor encrypted;
  scrambled or encrypted, but not encoded;
  scrambled or encrypted, but not compressed;
  encoded, and scrambled or encrypted; or
  compressed, and scrambled or encrypted.

Likewise, the terms "decoded" and "decompressed" on the one hand, and the terms "descrambled" and "decrypted" on the other hand, are used to refer to different and exclusive types of processing.

Once the chunk of content has been stored in one of the plurality of buffers, the chunk is indexed by an indexing process 230. As described above, the indexing process 230:
  determines a location of each ECM comprised in the chunk;
  determines a location of each reference frame comprised in the chunk; and
  creates a chunk index 240 of locations of each ECM comprised in the chunk and each reference frame comprised in the chunk 250. The chunk 250 and the chunk index 240 are combined to form a chunk file 260. The chunk file 240 is described below in greater detail with reference to FIG. 3.

Once the chunk index 240 and the chunk file 260 are created, the chunk file 260 is output, and the buffer becomes available for storing subsequent chunks of the content item 205.

As described above with reference to FIG. 1, each chunk file 60 is combined into a data stream 270. The data stream 270 is output for broadcast 280 in a single channel in a multiplexed broadcast service. A method and system for dynamic construction of a digital broadcast multiplexes transport stream based on event level metadata is found in the as yet unpublished PCT/IB2010/052960, of NDS Ltd. The method and system described in as yet unpublished PCT/IB2010/052960 is one which would be suitable for outputting the data stream 270 in a in a single channel in a multiplexed broadcast service.

By encoding the content items 205 using an encoder 210 that has been configured to use an average bitrate less than the configured bandwidth of the data stream 270, the resulting chunk 250 is transmitted faster than real-time. For example and without limiting the generality of the foregoing, if an entire multiplex of 33 megabits per second were configured to be used for delivery of chunked content and broadcast using the system and method of the present invention as described herein, and the content item 205 has been encoded at 2 megabits per second, the chunk will be broadcast roughly 15 times faster than real-time. Using the previous example of the chunk of 30 second duration, such a chunk would take 2 seconds to broadcast.

A client device that is configured to record the single channel in the multiplexed broadcast service comprising the data stream 270 will create recordings for each event in the service. While a chunk is being received the chunk will be appended to the appropriate recording. The chunk index 240 portion of the chunk file 260 is also stored as metadata associated with the appropriate recording.

A consequence of the client device recording method described above is that the client device is able to record multiple live events, something that is not possible with a conventional broadcast. There are two main reasons why a client device is not able to record multiple live events. The first reason is that there is insufficient hard disk bandwidth to make more than a few simultaneous recordings. The second reason is the lack of sufficient hardware to parse and index the stream comprising the multiple live events.

The present invention, in embodiments thereof, gets around the limitations caused by lack of hard disk bandwidth because there is only ever one chunk being broadcast at a time in the multiplexed broadcast service comprising the data stream 270. Thus, the hard disk only needs to seek when one chunk ends and the next chunk (for a different event) starts. As noted above, using a video encoder 210, the resulting chunk 250 is transmitted faster than real-time. Faster than real-time transmission is not a problem for the client device because the continuous transfer speed of the hard disk is much higher than the bandwidth of the multiplexed broadcast service comprising the data stream 270. Other techniques that can be used to avoid disk running out of disk transfer speed due to excessive seeking is to introduce buffering in the client device. However, doing so has the disadvantage of requiring extra RAM in the client device, thereby increasing the cost of the client device.

Alternatively, an entire multiplex may be recorded in one file. However, a consequence of recording an entire multiplex in one file is that when playing an event from the one recorded file requires reading the entire multiplex from disk, which greatly increases the read transfer bandwidth required. Additionally, recording an entire multiplex in a single file also effectively prevents the deletion of any single content item as the entire multiplex must be deleted together.

The second reason for constraints to simultaneous recording of conventionally broadcast events is the lack of indexing hardware. In a typical DVR the stream that is being recorded is parsed to build an index of the file to allow for trick play and random access. In an XTV DVR this parsing is performed by a hardware component of the sort described in published PCT application WO01/35669 and in published PCT application WO03/010970.

The hardware component has a fixed number of streams that the hardware component can simultaneously parse, which puts a limit upon the number of conventionally broadcast events that can be simultaneously recorded. The present invention, in embodiments thereof, gets around this problem because the indexing is provided with the chunk index 240 incorporated in the chunk file 260 comprised in the multiplexed broadcast service comprising the data stream 270. Incorporating the index in the received data stream removes the need for parsing of the stream in the DVR.

Figure 3:
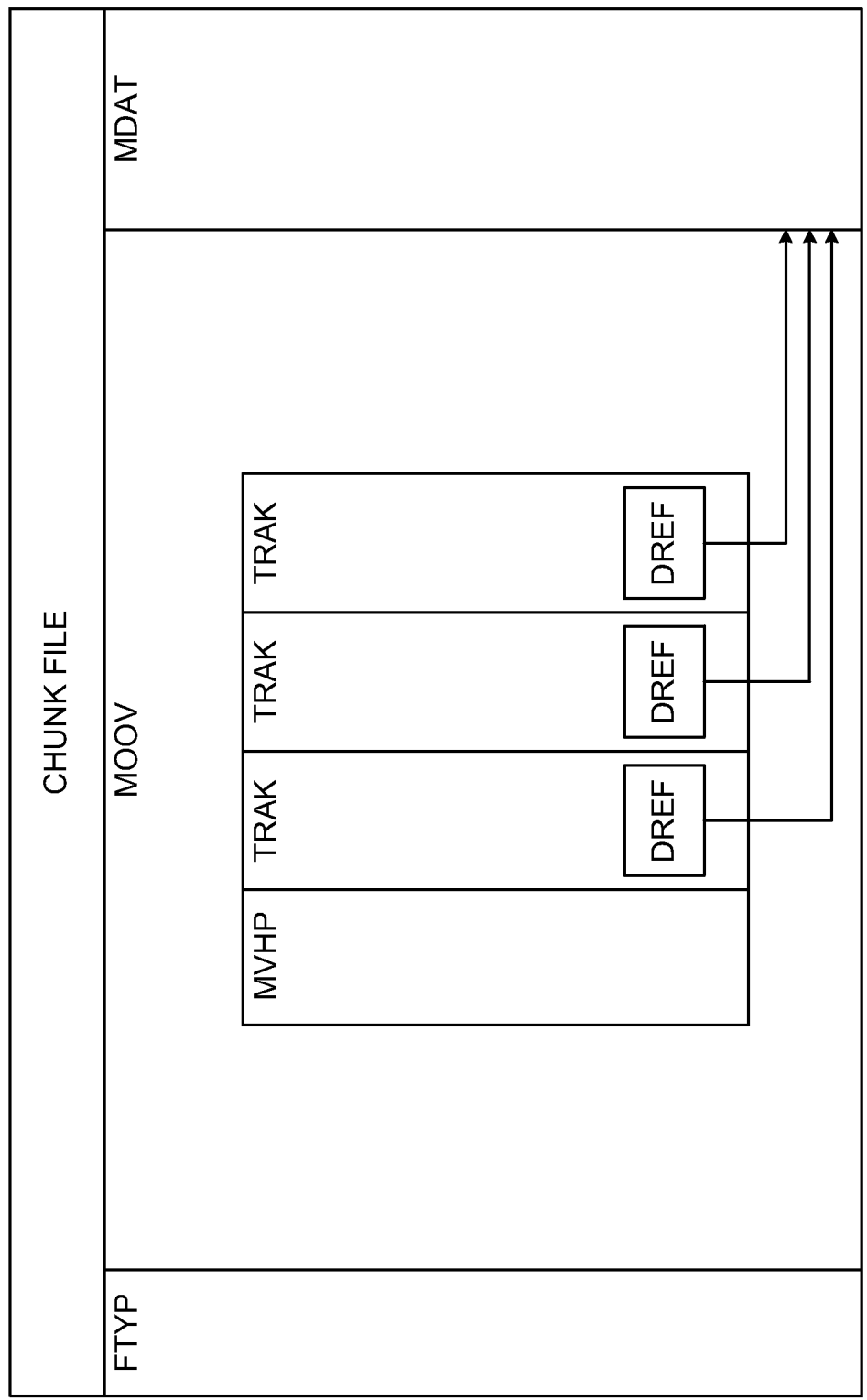
FIG. 3 is a simplified block drawing depicting an embodiment of a chunk file in the system of FIG. 1.

Reference is now made to FIG. 3, which is a simplified block drawing depicting an embodiment of the chunk file in the system of FIG. 1. The chunk file depicted in FIG. 3 is based on the ISO base media file format specified in ISO/IEC 14496-12, Information Technology—Coding of Audio-Visual Objects—Part 12: ISO Base Media File Format (Third Edition 2008). Files in ISO file format comprise a series of "boxes". A box is defined in ISO/IEC 14496-12 as an object-oriented building block defined by a unique type identifier and length. Each box has a four character name, the name referring to the type of data contained in the box. The table below lists the names of the boxes depicted in FIG. 3, and provides an explanation of the four character name depicted in FIG. 3. Additionally, the table below uses a nested structure reflecting the structure of the file depicted in FIG. 3. It is appreciated that since the boxes in the chunk file structure depicted in FIG. 3 are referred to by their four character name, reference numerals are not used.

| | FOUR CHARACTER NAME | | | DESCRIPTION |
|---|---|---|---|---|
| Chunk File Format | FTYP | | | File Type and Compatibility |
| | MOOV | | | Container for metadata |
| | | MVHP | | Movie header, overall declarations |
| | | | TRAK | Metadata about one track |

-continued

| | FOUR CHARACTER NAME | | | DESCRIPTION |
|---|---|---|---|---|
| | | | DREF | Data reference point, declares source(s) of media data in track |
| | | TRAK | | |
| | | | DREF | |
| | | TRAK | | |
| | | | DREF | |
| MDAT | | | | Contains all the audio-visual data |

The term "track" in the table above, and as used henceforth, is understood to mean a timed sequence of related samples in the chunk file. The term "sample" as used above, and as used henceforth, is understood to refer to all of the data associated with a single timestamp.

The use of the chunk file poses a problem because, in a typical case, the chunk file cannot be created without having all compressed audio-visual data for a complete event available, because the MOOV box comprises pointers which point to compressed audio-visual data comprised in the MDAT box or boxes. For live broadcasts, the audio-visual data is typically received at a broadcast headend at the same time as the audio-visual data is being filmed. Thus, the only point at which the whole data is known is at the end of a broadcast. In order to create the chunks required for embodying the present invention, an optional feature of the ISO 14496-12 file format called Movie Fragments (MOOF) is utilized. Movie Fragments are a way of adding content to the end of the chunk file.

Figure 4:
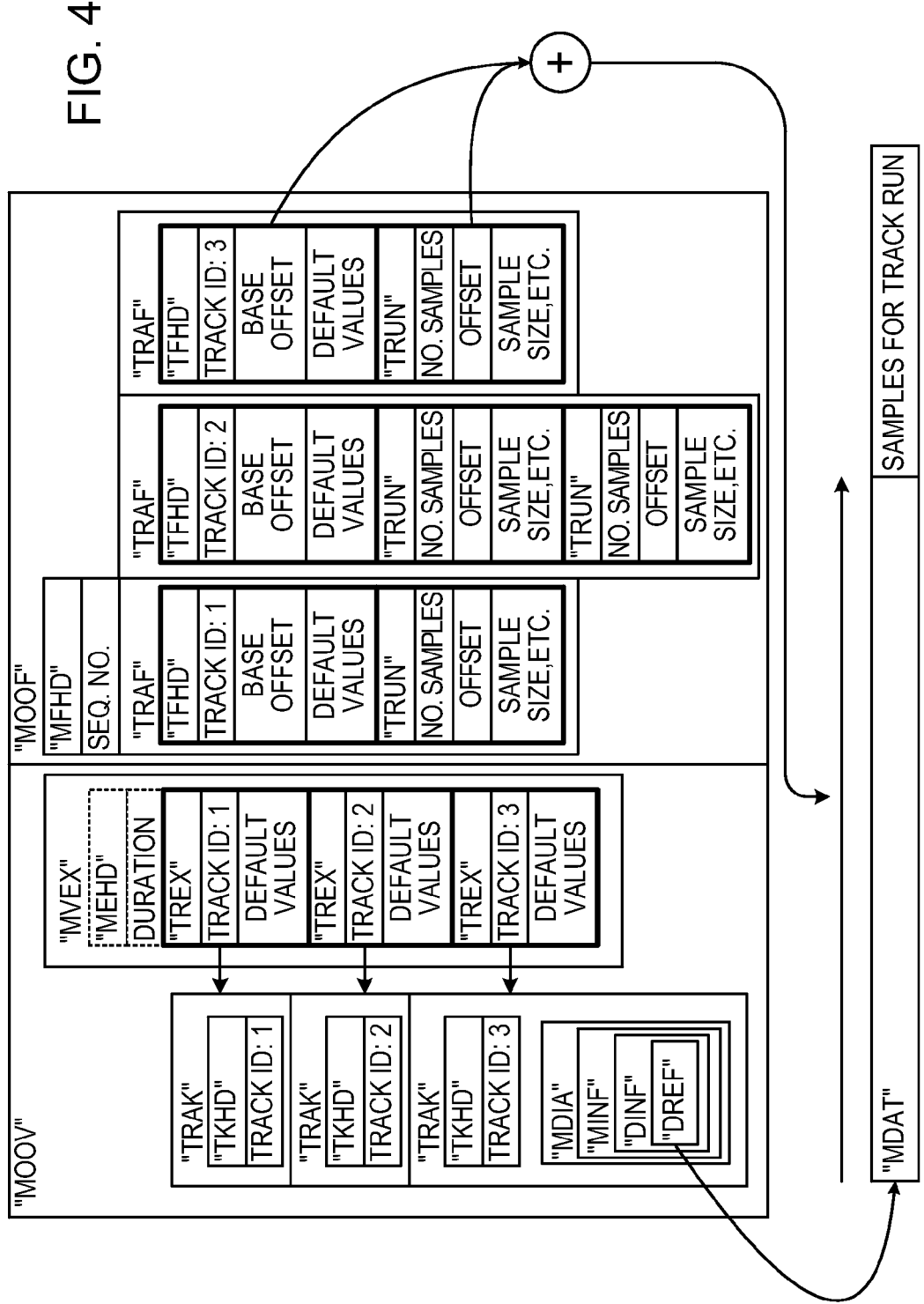
FIG. 4 is a simplified block drawing of an exemplary movie fragment in the chunk file of FIG. 3.

Reference is now made to FIG. 4, which is a simplified block drawing of an exemplary movie fragment in the chunk file of FIG. 3. Those skilled in the art will appreciate that a chunk file comprising movie fragments still has the headers comprised in the MOOV box. However, the MOOV box omits indexing boxes, indicating that there are no samples at the MOOV level.

Movie fragments use components that contain samples from a track, but with use slightly different terminology and a different structure in the file. The structure has been revised in order to make it easier to create chunk files that "grow", without requiring continual updating of the chunk files.

There may be an arbitrary number of movie fragments in a file. Each movie fragment contains any number of track fragments.

Receipt of a first chunk for a content item causes a new chunk file to be created. The newly created chunk file contains the FTYP and the MOOV boxes, as depicted in FIG. 3. The FTYP and the MOOV boxes comprise codec specific information, as required by a client device decoder. The MOOV box does not contain a media index, as this will be contained in a subsequent MOOF box.

The audio-visual data for all chunks of the content item are indexed in order to provide the indexing information in the MOOF box, followed by the audio-visual data in an MDAT box.

Accordingly, the timeline for one content item would be:
A first content item chunk file for the content item:
[FTYP] [MOOV] [MOOF] [MDAT]
Subsequent content item chunk files for the content item:
[MOOF] [MDAT]

The FTYP and MOOF boxes are inserted into a data carousel that is broadcast as part of a live broadcast comprised in a single channel in a multiplexed broadcast service. The FTYP and MOOV boxes are kept in the data carousel until after the end of the live broadcast since the FTYP and MOOV boxes are required for the client device to be able to play any part of the content item. In that it cannot be guaranteed that all client devices will be receiving the live broadcast from its beginning, the FTYP and MOOV are repeatedly broadcast in the data carousel. In the present usage model the FTYP and MOOV boxes are typically very small, and thus do not add appreciably to the overall data transmission requirements.

MDAT boxes are broadcast using private data PIDs in the single channel in the multiplexed broadcast service. Typically, each MDAT box is preceded by a chunk notification packet (CNP) which describes the chunk with which the MDAT box is associated. The CNP is typically structured as an MPEG-2 compliant private data section contained within a single transport packet and placed in the CNP metadata PID. The CNP PID is typically defined as a separate component within the PMT and is exclusively used for CNP packets.

MOOF boxes are also inserted in to a data carousel that is broadcast in the live broadcast comprised in the single channel in the multiplexed broadcast service. However MOOF boxes are typically only required to remain within the carousel for a short period of time (e.g. 1 minutes) after its associated MDAT box has been broadcast. Those skilled in the art will appreciate that the MOOF boxes do not need to remain within the data carousel for the entire duration of the live broadcast because the MOOF boxes are only required when their associated MDAT boxes have been received and recorded.

Referring specifically to FIG. 4, the following table details boxes and their four character name:

| | FOUR CHARACTER NAME | | | | | DESCRIPTION |
|---|---|---|---|---|---|---|
| MOOV | | | | | | Container for metadata |
| | TRAK | | | | | Metadata about one track |
| | | TKHD | | | | Track header, overall information about the track |
| | | MDIA | | | | Container for the media information in a track |
| | | | MINF | | | Media information container |
| | | | | DINF | | Data information box container |
| | | | | | DREF | Data reference box, declares source(s) of media data in the track |
| | MVEX | | | | | Movie extends box |
| | | MEHD | | | | Movie extends header box |
| | | TREX | | | | Track extends defaults |
| MOOF | | | | | | Movie fragment |
| | MFHD | | | | | Movie fragment header |
| | TRAF | | | | | Track fragment |
| | | TFHD | | | | Track fragment header |
| | | TRUN | | | | Track fragment run |

Figure 5:
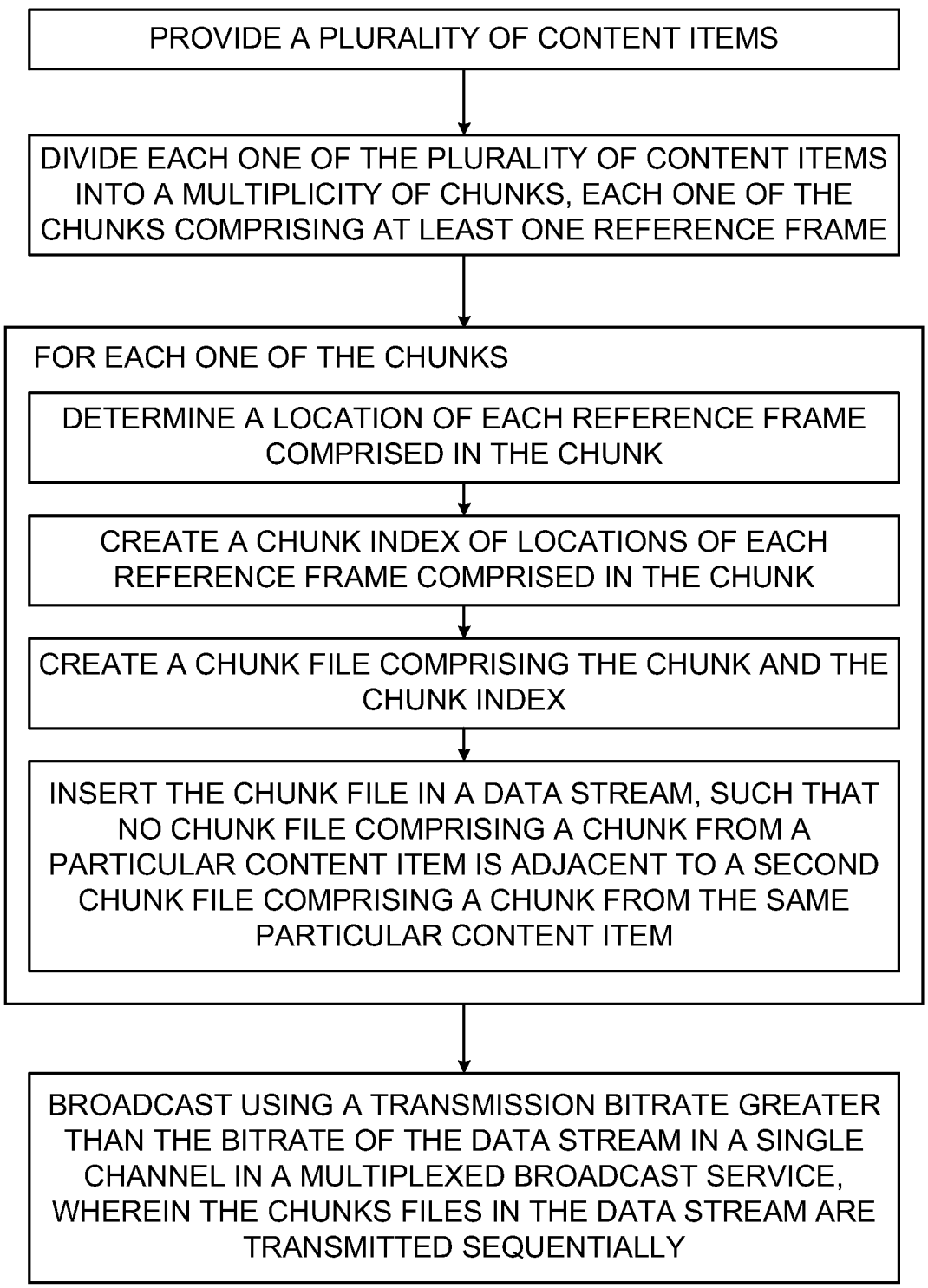
FIG. 5 is a simplified flow chart of a method of operation of the system of FIG. 1.

Reference is now made to FIG. 5, which is a simplified flow chart of a method of operation of the system of FIG. 1. The method of FIG. 5 is believed to be self explanatory with reference to the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for broadcasting content, the method facilitating simultaneous recording of multiple programs on a digital video recorder (DVR), the method comprising:
   providing a plurality of content items;
   dividing each one of the plurality of content items into a multiplicity of chunks, each of the chunks having a duration bounded by a minimum duration beneath which a hard drive in a client device has insufficient transfer speed to record the content item and by a maximum size due to a real time playback delay introduced by storing the chunk on the hard drive in the client device, each one of the chunks comprising at least one reference frame, and at least one non-reference frame;
   for each one of the chunks:
      determining a location of each reference frame comprised in the chunk;
      creating a chunk index of locations of each reference frame comprised in the chunk;
      creating a chunk file comprising the chunk and the chunk index; and
      inserting the chunk file in a data stream, the data stream having a bitrate, such that no chunk file comprising a chunk from a particular content item is adjacent to a second chunk file comprising a chunk from the same particular content item; and
   broadcasting using a transmission bitrate greater than the bitrate of the data stream in a single channel in a multiplexed broadcast service,
   wherein the chunk files in the data stream are transmitted sequentially.

2. The method according to claim 1 and wherein the content item comprises an encrypted content item.

3. The method according to claim 2 and wherein each of the chunks of the multiplicity of chunks comprises at least one ECM.

4. The method according to claim 3 and further comprising:
determining, for each one of the chunks, a location of each ECM comprised in the chunk;
including in the chunk index of locations the location each ECM comprised in the chunk.

5. The method according to claim 1 and wherein each chunk of the multiplicity of chunks comprises a chunk of fixed play-back duration.

6. The method according to claim 1 and wherein the content item comprises a compressed content item.

7. The method according to claim 6 and wherein the compressed content item comprises an H.264/MPEG-4 compressed content item.

8. The method according to claim 6 and wherein the compressed content item is encapsulated using ISO 14496-12 file format Movie Fragments (MOOF).

9. The method according to any of claim 1 and wherein the content item comprises a live broadcast content item.

10. The method according to claim 1 wherein each chunk comprises a chunk of fixed play-back duration.

11. The method according to claim 10 and wherein the fixed play-back duration of each chunk of the plurality of chunks is bounded by a minimum duration beneath which a hard drive in a client device has insufficient transfer speed to record the content item and by a maximum size due to a real time playback delay introduced by storing the chunk on the hard drive in the client device.

12. A system for broadcasting content, the system facilitating simultaneous recording of multiple programs on a digital video recorder (DVR), the system comprising:
a plurality of content items, each one of the plurality of content items being divided into a multiplicity of chunks, each of the chunks having a duration bounded by a minimum duration beneath which a hard drive in a client device has insufficient transfer speed to record the content item and by a maximum size due to a real time playback delay introduced by storing the chunk on the hard drive in the client device, each one of the chunks comprising at least one reference frame, and at least one non-reference frame, wherein each chunk is chunk of fixed play-back duration;
for each one of the chunks:
a location of each reference frame comprised in the chunk is determined;
a chunk index of locations of each reference frame comprised in the chunk is created;
a chunk file comprising the chunk and the chunk index is created; and
a chunk file insertion mechanism which inserts the chunk file in a data stream, such that no chunk file comprising a chunk from a particular content item is adjacent to a second chunk file comprising a chunk from the same particular content item; and
a broadcast mechanism which broadcasts using a transmission bitrate greater than the bitrate of the data stream in a single channel in a multiplexed broadcast service,
wherein the chunks files in the data stream are transmitted sequentially.

* * * * *